United States Patent
Chen et al.

(10) Patent No.: US 11,505,850 B2
(45) Date of Patent: Nov. 22, 2022

(54) 7000-SERIES ALUMINUM ALLOY WIRE FOR ADDITIVE MANUFACTURING AND PREPARATION METHOD THEREOF

(71) Applicant: Jiangxi University of Science and Technology, Ganzhou (CN)

(72) Inventors: Jiqiang Chen, Ganzhou (CN); Chao Liu, Ganzhou (CN); Qilong Li, Ganzhou (CN); Liang Qi, Ganzhou (CN); Hongjin Zhao, Ganzhou (CN)

(73) Assignee: Jiangxi University of Science and Technology, Ganzhou (CN)

( * ) Notice: Subject to any disclaimer, the term of this patent is extended or adjusted under 35 U.S.C. 154(b) by 153 days.

(21) Appl. No.: 16/911,460

(22) Filed: Jun. 25, 2020

(65) Prior Publication Data

US 2020/0407827 A1   Dec. 31, 2020

(30) Foreign Application Priority Data

Jun. 28, 2019   (CN) .......................... 201910576729.6

(51) Int. Cl.
*B33Y 70/00*   (2020.01)
*C21D 8/06*   (2006.01)
(Continued)

(52) U.S. Cl.
CPC .............. *C22C 21/10* (2013.01); *B33Y 70/00* (2014.12); *C21D 8/06* (2013.01); *C21D 9/525* (2013.01); *C22F 1/053* (2013.01); *C22C 1/03* (2013.01)

(58) Field of Classification Search
CPC .......... C22C 21/10; C22C 21/00–21/18; C22F 1/053; C22F 1/04–1/057
See application file for complete search history.

(56) References Cited

U.S. PATENT DOCUMENTS

| 4,747,889 | A | * | 5/1988 | Nishio | .................... | H01L 24/85 |
| | | | | | | 148/438 |
| 2011/0165014 | A1* | | 7/2011 | Banerji | .................... | C22C 21/10 |
| | | | | | | 420/540 |
| 2019/0032175 | A1* | | 1/2019 | Martin | ...................... | C22C 1/10 |

FOREIGN PATENT DOCUMENTS

CN   108080815 A   *   5/2018   ............. B22D 18/04

OTHER PUBLICATIONS

Yadav, Devinder, and Ranjit Bauri. "Friction stir processing of Al-TiB2 in situ composite: effect on particle distribution, microstructure and properties." Journal of Materials Engineering and Performance 24.3 (2015): 1116-1124. (Year: 2015).*

(Continued)

*Primary Examiner* — Anthony J Zimmer
*Assistant Examiner* — Sean P. O'Keefe
(74) *Attorney, Agent, or Firm* — Troutman Pepper Hamilton Sanders LLP; Christopher C. Close, Jr.

(57) ABSTRACT

The present invention relates to the technical field of manufacturing of metal materials, and in particular to a 7000-series aluminum alloy wire for additive manufacturing and a preparation method thereof. The wire was prepared by subjecting an Al—Ti—B intermediate alloy containing $TiB_2$ particles generated in situ to severe plastic deformation to obtain an intermediate alloy containing $TiB_2$ nanoparticles having a particle size of 50-1,000 nm or a mixture of two different particles; using the intermediate alloy containing $TiB_2$ nanoparticles as a matrix raw material, adding other metal or intermediate alloy for smelting to obtain an alloy melt; preparing a wire blank with the alloy melt; subjecting the wire blank to hot rolling, drawing, intermediate annealing and surface treatment to obtain an Al—Zn—Mg—Cu alloy wire reinforced by particles at nano scale or submicron scale.

16 Claims, 7 Drawing Sheets

(51) Int. Cl.
*C21D 9/52* (2006.01)
*C22F 1/053* (2006.01)
*C22C 1/03* (2006.01)
*C22C 21/10* (2006.01)

(56) References Cited

OTHER PUBLICATIONS

CN108080815A English language translation (Year: 2018).*

* cited by examiner

7000-SERIES ALUMINUM ALLOY WIRE FOR ADDITIVE MANUFACTURING AND PREPARATION METHOD THEREOF

CROSS REFERENCE TO RELATED APPLICATIONS

This application claims priority, and benefit under 35 U.S.C. § 119(e) of Chinese Patent Application No. 201910576729.6 filed 28 Jun. 2019. The disclosure of the prior application is hereby incorporated by reference as if fully set forth below.

TECHNICAL FIELD

The present invention relates to the technical field of manufacturing of metal materials, and in particular to a 7000-series aluminum alloy wire for additive manufacturing and a preparation method thereof.

BACKGROUND

Additive manufacturing is commonly known as 3D printing. Laser additive manufacturing technology, a type of 3D printing, uses a laser as a heat source to construct an entity through layer-by-layer manufacturing. The laser additive manufacturing technology includes two relatively mature processes, laser solid forming (LSF) and selective laser melting (SLM), which use metal (non-metal or metal matrix composite) powder as raw materials.

Aluminum alloy has excellent electrical and thermal conductivity, high strength-to-mass ratio, and desired corrosion and damage resistance; therefore, it is widely used in many fields such as aerospace, rail transit and automobile. Compared with titanium alloy, iron-based alloy and nickel-based alloy and the like, aluminum alloy powder has features such as high laser reflectivity (up to 91%), high thermal conductivity, easy oxidation, low density, and poor powder flowability. These features result in extremely high requirements on laser additive manufacturing technology, which greatly limits development of the aluminum alloy in rapid manufacturing.

Laser-arc composite additive manufacturing is a new and efficient additive manufacturing technology based on laser-arc hybrid welding, which uses laser and arc as a composite heat source and aluminum alloy wire as a filling material. Development of this technology greatly promotes application of the aluminum alloy in rapid manufacturing.

However, for high strength aluminum alloys, such as 7000 series aluminum alloys (that is, Al—Zn—Mg—Cu alloys), there is a problem that hot cracking is prone to occur during solidification (in an additive manufacturing process). That is, in the laser-arc composite additive manufacturing, there are obvious cracks in a medium to high strength aluminum alloy with relatively low alloy strength after solidification, which seriously affects performances of a high strength aluminum alloy component.

Therefore, in view of the above problem, the present invention provides a high strength 7000 series aluminum alloy wire for additive manufacturing and a preparation method thereof. The alloy wire has low sensitivity to hot cracking during solidification after melting of the alloy wire and the strength of the alloy after solidification is relatively high. The present invention has a very important value in innovation and engineering application in additive manufacturing of high strength aluminum alloy components.

SUMMARY

The present invention provides a 7000-series aluminum alloy wire for additive manufacturing with low sensitivity to hot cracking and relatively high strength after solidification, and a preparation method thereof.

In order to achieve the foregoing objective, the present invention employs the following technical solutions:

A 7000-series aluminum alloy wire for additive manufacturing, prepared by smelting and processing an Al—Ti—B intermediate alloy containing $TiB_2$ nanoparticles with other metal or intermediate alloy, where the nanoparticles having a particle size of 50-1,000 nm in the wire are dispersed in an alloy matrix, and the wire has the following chemical components in weight percentage: Zn: 5.0-7.5%, Mg: 1.5-3.0%, Cu: 1.0-2.5%, Ti: 1.0-3.0%, Sc: 0-0.6%, Cr: 0.05-0.2%, B: 0.2-1.0%, and Al and other inevitable impurity elements as balance.

This technical solution has the following working principles and beneficial effects:

1. During the additive manufacturing process, $TiB_2$ nanoparticles in the 7000 series aluminum alloy wire reinforced by particles in this solution can play a role in refining grains. Compared with an alloy wire without nanoparticles, solidification of a melt in the present solution forms fine equiaxed crystals (low crack sensitivity) instead of coarse column-like grains (high crack sensitivity). Change of solidification mode reduces the crack sensitivity of the alloy wire during solidification, and refined grains of nanoparticles can significantly improve as-cast strength of the alloy.

2. In this solution, $TiB_2$ particles are at nano scale or submicron scale (50 nm-1.0 pin) which allows a relatively regular shape of the nanoparticles macroscopically. Thus, the nanoparticles are better combined with the 7000-series (Al—Zn—Mg—Cu) aluminum alloy at an interface, so that the as-cast strength of the 7000-series aluminum alloy has a relatively large improvement.

3. In this solution, the nanoparticles have a relatively high melting point (over 2,950° C.), while the 7000-series (Al—Zn—Mg—Cu) aluminum alloy is usually smelted at a temperature not exceeding 800° C. Thus, during a smelting process, the nanoparticles are not melted and have relatively stable properties and shape, so that grains of the 7000-series (Al—Zn—Mg—Cu) aluminum alloy can be well refined. Moreover, the nanoparticles are dispersed in the 7000-series (Al—Zn—Mg—Cu) aluminum alloy, which further improves the overall performance of the 7000 series (Al—Zn—Mg—Cu) aluminum alloy wire reinforced by particles.

Further, a weight ratio of Ti to B in the Al—Ti—B intermediate alloy is x:1, where x>2.2.

Beneficial effect: Ti and B in a weight ratio of 2.2:1 are completely converted to $TiB_2$, that is to say, under ideal conditions where x=2.2, there is no excessive Ti or B in a melt. After generation of $TiB_2$ by Ti and B fully, the excessive Ti in the melt will form $Al_3Ti$ particles with Al. $Al_3Ti$ particles also play a role in refining the grains of the 7000-series aluminum alloy. Thus, x is set to be greater than 2.2, so that $Al_3Ti$ particles can be formed in the melt to refine grains together with $TiB_2$ particles.

Further, x≤3.

Beneficial effect: Although $Al_3Ti$ particles play a role in refining the grains of the 7000-series aluminum alloy, the inventors find that when x>3, there is too high a content of Ti in an alloy melt. This results in formation of coarse $Al_3Ti$ particles and has an adverse effect on the 7000-series aluminum alloy.

Further, a preparation method of the 7000-series aluminum alloy wire for additive manufacturing includes the following steps:

step 1: subjecting an Al—Ti—B intermediate alloy containing $TiB_2$ particles generated in situ to severe plastic deformation to obtain an intermediate alloy containing $TiB_2$ nanoparticles having a particle size of 50-1,000 nm;

step 2: using the intermediate alloy containing $TiB_2$ nanoparticles obtained in step 1 as a matrix raw material, adding other metal or intermediate alloy, smelting at 750-780° C., and casting into a cast round rod;

step 3: subjecting the cast round rod obtained in step 2 to hot extrusion to obtain a wire blank with φ of 8-10 mm; and step 4: subjecting the wire blank obtained in step 3 to hot rolling, drawing, intermediate annealing and surface treatment to obtain a 7000-series aluminum alloy wire reinforced by particles with φ of 1.0 mm-2.4 mm.

The inventors' clever idea in this application:

Some studies have found that an aluminum matrix alloy wire reinforced by particles with relatively high strength can be obtained by adding $TiB_2$ particles (in a powder metallurgy process) or by in situ generation of $TiB_2$ particles. Aluminum matrix alloy wire reinforced by particles in situ refers to the $TiB_2$ ceramic particles directly generated by a reaction with a melt in an aluminum matrix. In situ generated $TiB_2$ particles are at micro-nano scale, so during preparation of aluminum matrix composites reinforced by $TiB_2$ particles, a large amount of micro-nano particles are agglomerated in the melt when driven by an interfacial energy, and moved by a front of a solid-liquid interface during subsequent solidification. Finally, a lot of agglomerates appear at a grain boundary of a solidified structure of the matrix, resulting in uneven size distribution of the in-situ generated particles with a large particle size up to 50-70 μm. At the same time, the particles having a large size are irregular in shape and poorly combined with the matrix at an interface, which greatly reduces the strength of an aluminum matrix composite material.

In order to solve the above problems, researchers mainly have two directions. One direction points to control of an in situ reaction process to form nanoparticles with a smaller particle size (at nano scale) in the melt which will not agglomerate. But the effect is not desired since a generation reaction in the melt and solidification of a liquid phase are too complicated to control. The other direction points to severe plastic deformation to break the agglomerated in situ nanoparticles after smelting and casting of an Al—Zn—Mg—Cu alloy containing in situ generated nanoparticles.

For the second direction, more alloying elements in known alloy materials (metal composite materials) will lead to higher degree of alloying and poorer plastic processing performance of the materials. Thus, requirements on equipment technology and deformation conditions are increased to such an extent that it is almost impossible for large plastic deformation of aluminum matrix composite materials reinforced by particles. Even if the large plastic deformation is possible under extreme conditions, a processed sample often has a relatively small size, which is hardly suitable for practical engineering applications.

However, the inventors of the present application have taken a different approach by first subjecting the intermediate alloy containing in situ generated nanoparticles to severe plastic deformation, and then adding other metal or intermediate alloy for smelting. Such a preparation method has the following features:

(1) Al—Ti—B intermediate alloy containing $TiB_2$ particles, also known as refiner, are generated in situ. As a name implies, the particles are usually added in a small amount during smelting of aluminum matrix alloys to achieve grain refinement, which is relatively common in a market. Thus, Al—Ti—B matrix alloys containing different Ti/B ratios can be customized to meet process requirements.

(2) The Al—Ti—B intermediate alloy includes a highest proportion of Al matrix alloys, while there is only one alloying element of Ti. As can be seen from FIG. 1, the Al—Ti—B intermediate alloy has a relatively large grain size due to a large amount of agglomerates of the nanoparticles during an in situ generation process, resulting in little effect of grain refinement. But it is the fewer alloy elements and coarse grains with a large size that make severe plastic deformation of the Al—Ti—B intermediate alloy easier, and make the process simple without high requirements.

(3) Due to a high melting point of the nanoparticles (over 2,950° C.), no melting of the nanoparticles will occur during smelting (not exceeding 800° C.). It is because of the high melting point that the intermediate alloy containing the nanoparticles after severe plastic deformation is stable and not prone to agglomerate during smelting with other metal or intermediate alloy. Thus, the nanoparticles can be evenly distributed in the Al—Zn—Mg—Cu alloy structure, and it is due to even distribution of the nanoparticles that the alloy wire has low crack sensitivity during solidification in additive manufacturing (with a temperature not exceeding 800° C.).

Further, the severe plastic deformation in step 1 is implemented by a high-speed friction stir process with a stirring needle at 800-2,000 r/min for 1-5 times.

Beneficial effect: The basic principle of the high-speed friction stir process is that, strong stirring by the stirring needle causes severe plastic deformation, mixing, and crushing of a material to be processed. Thus, a densified, homogenized and refined microstructure of the material is obtained. Nanoparticles having a size of 50-1,000 nm can be obtained with the parameters of the present solution.

Further, the severe plastic deformation in step 1 is implemented by an equal-channel angular pressing process with a channel angle of 90-120 degrees for 1-5 cycles.

Beneficial effect: The principle of the equal channel angular pressing process is to press a polycrystalline material into a die to achieve large deformation by a shear deformation process. The shear deformation process mainly uses a nearly pure shearing effect during deformation to refine a material grain, so that mechanical and physical properties of the material can be significantly improved. Nanoparticles having a size of 50-1,000 nm can be obtained with the parameters of the present solution.

Further, the severe plastic deformation in step 1 is implemented by a high-pressure torsion process with 1-20 turns.

Beneficial effect: The principle of the high-pressure torsion process is that, while applying pressure in a direction of height of a material, a torque is applied to a cross-section of the material by active friction to promote axial compression and tangential shear deformation of the material. Nanoparticles having a size of 50-1,000 nm can be obtained with the parameters of the present solution.

Further, the cast round rod in step 3 is subjected to homogenizing heat treatment at 450-490° C. for 10-24 h before hot extrusion at 400-450° C. at 5-10 mm/min.

Beneficial effect: Homogenizing heat treatment under the above parameters can improve a crystalline structure of the cast round rod, eliminate casting stress and reduce segregation. Moreover, hot extrusion is carried out above a recrystallization temperature of an aluminum-silicon alloy to quickly obtain a wire blank with φ of 8-10 mm.

Further, the hot rolling in step 4 is carried out at 350-420° C. for 0.5-1 h, and cold drawing is carried out at a normal temperature.

Beneficial effect: Heat treatment under the above parameters before hot rolling can improve rolling performance of the wire blank effectively.

Further, the intermediate annealing in step 4 is carried out at 380-430° C. for 1-6 h, and the surface treatment includes surface scraping, sizing, degreasing and cleaning.

Beneficial effect: Annealing at 380-430° C. can effectively eliminate hardening of the wire blank after drawing and restore plasticity of the wire blank. During the hot rolling, the drawing or the annealing, an oxide layer and the like may appear on a surface of the wire blank. Therefore, a finished wire which meets requirements can be obtained after surface treatment.

DETAILED DESCRIPTION

Figure 1:
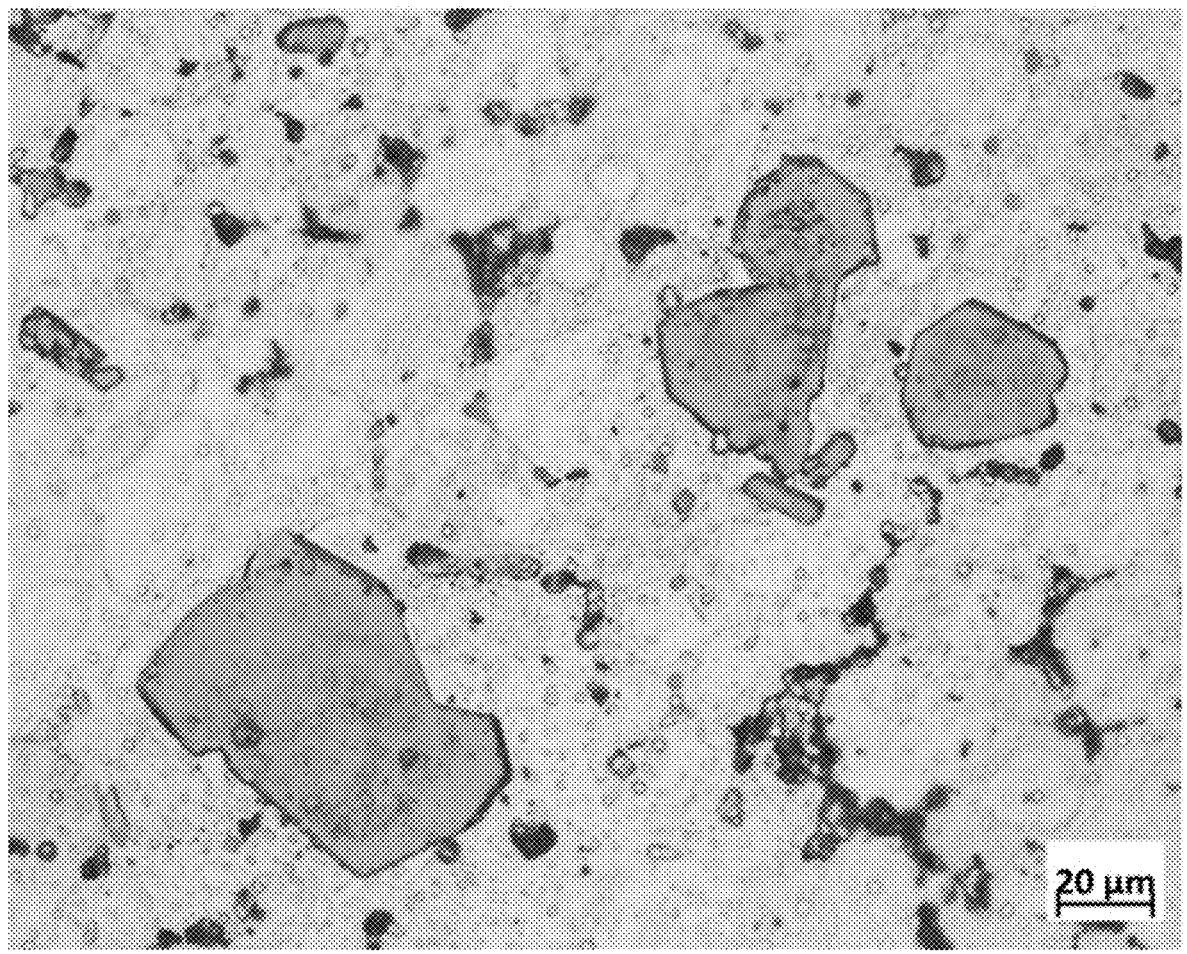
FIG. 1 shows a metallographic structure of an original Al-2.3Ti—B alloy in Example 1.

The present invention is described in more detail below with reference to the specific implementations.

A 7000-series aluminum alloy wire for additive manufacturing, prepared by smelting and processing an Al—Ti—B intermediate alloy containing TiB2 nanoparticles with other metal or intermediate alloy, where the nanoparticles having a particle size of 50-1,000 nm in the wire are dispersed in an alloy matrix, and the wire has the following chemical components in weight percentage: Zn: 5.0-7.5%, Mg: 1.5-3.0%, Cu: 1.0-2.5%, Ti: 1.0-3.0%, Sc: 0-0.6%, Cr: 0.05-0.2%, B and/or C: 0.2-1.0%, and Al and other inevitable impurity elements as balance. Moreover, a weight ratio of Ti to B in the Al—Ti—B intermediate alloy is x:1, where $2.2<x\leq3$.

The inventors have found through a large number of experiments that within the following parameter ranges, a prepared Al—Zn—Mg—Cu alloy wire reinforced by particles has low sensitivity to hot cracking during solidification in additive manufacturing, and a relatively high strength after solidification. In the present invention, five groups are listed and illustrated.

The parameters for a 7000-series aluminum alloy wire for additive manufacturing and a preparation method thereof in each of Examples 1-5 of the present invention were shown in Table 1:

TABLE 1

| | | Example | | | | |
| --- | --- | --- | --- | --- | --- | --- |
| | | 1 | 2 | 3 | 4 | 5 |
| x | | 2.3 | 2.3 | 2.5 | 2.8 | 3 |
| Smelting temperature (° C.) | | 760 | 750 | 770 | 780 | 760 |
| Homogenizing heat treatment | Holding temperature (° C.) | 500 | 470 | 480 | 520 | 530 |
| | Holding time (h) | 12 | 24 | 20 | 10 | 6 |
| Heat extrusion | Extruding temperature (° C.) | 400 | 420 | 430 | 440 | 450 |
| | Extruding speed (mm/min) | 5 | 5 | 5 | 10 | 10 |
| Hot rolling | Holding temperature (° C.) | 400 | 350 | 360 | 410 | 420 |
| | Holding time (h) | 1 | 1 | 1 | 0.5 | 0.5 |
| Intermediate annealing | Annealing temperature (° C.) | 400 | 380 | 390 | 420 | 430 |
| | Holding time (h) | 5 | 6 | 4 | 2 | 1 |

Now Example 1 was taken as an example to illustrate another technical solution of the present invention. a preparation method of the 7000-series aluminum alloy wire for additive manufacturing.

A preparation method of a 7000-series (Al—Zn—Mg—Cu) aluminum alloy having components in weight percentage of Al-6Zn-2.5Mg-1.5Cu-1.94Ti-0.85B-0.2Cr was used as an example to describe the method in detail. That is, preparation of 100 kg of the alloy needed 6 kg of pure zinc, 2.5 kg of pure magnesium, 3.0 kg of Al-50Cu intermediate alloy, 4 kg of Al-5Cr intermediate alloy, and a remaining 84.5 kg of Al-2.3Ti—B intermediate alloy.

The preparation method of the 7000-series aluminum alloy wire for additive manufacturing included the following steps:

Step 1: 84.5 kg of the Al-2.3Ti—B intermediate alloy containing TiB2 particles generated in situ with most particles having a size of 2-5 μm was prepared and subjected to severe plastic deformation to obtain an Al—Ti—B intermediate alloy containing TiB2 nanoparticles having a size of 50-1,000 nm.

The severe plastic deformation is implemented by a high-speed friction stir process with a stirring needle at 800-2,000 r/min for 1-5 times, or an equal-channel angular pressing process with a channel angle of 90-120 degrees for 1-5 cycles, or a high-pressure torsion process with 0.5-5 turns. In this example, the high-speed friction stir process was adopted.

Step 2: the Al—Ti—B intermediate alloy containing TiB2 nanoparticles obtained in step 1 was used as a matrix raw material. 6 kg of pure zinc, 2.5 kg of pure magnesium, 3.0 kg of Al-50Cu intermediate alloy, 4 kg of Al-5Cr intermediate alloy were added for smelting at 760° C., and casted into a cast round rod.

Step 3: the cast round rod obtained in step 2 was subjected to homogenizing heat treatment at 500° C. for 12 h. Then hot extrusion was carried out at 400° C. at 5 mm/min to obtain a wire blank with φ of 8-10 mm.

Step 4: the wire blank obtained in step 3 was subjected to hot rolling at 400° C. for 1 h, drawing at a normal temperature, intermediate annealing at 400° C. for 5 h, and surface treatment to obtain an Al—Zn—Mg—Cu alloy wire reinforced by TiB2 particles with φ of 1.0 mm-2.4 mm. In this step, the surface treatment included surface scraping with a thickness of 0.01-0.02 mm, sizing, degreasing and cleaning.

Moreover, a comparative example was listed to compare with the Al—Zn—Mg—Cu alloy wires reinforced by particles obtained in Examples 1-5 in a test:

Comparative Example 1 referred to a conventional Al—Zn—Mg—Cu alloy wire (without a severe plastic deformed Al—Ti—B intermediate alloy).

The alloy wires obtained in Examples 1-5 and Comparative Example 1 were tested:

An ECLIPSE MA200 optical microscope manufactured by Nikon was used for metallographic examination on the alloy wires obtained in Examples 1-5 and Comparative Example 1 with results shown in FIGS. 1-5:

An ECLIPSE MA200 optical microscope manufactured by Nikon was used for metallographic examination on the alloy wires obtained in Examples 1-5 and Comparative Example 1 with results shown in FIGS. 1-5:

FIG. 1 showed a metallographic structure of an original Al-2.3Ti—B intermediate alloy without severe plastic deformation in Example 1. It can be seen that, the TiB2 particles in the intermediate alloy were all at micron scale (2-50 μm) with a large distribution range of particle size. Large particles were irregular and had an obvious grain boundary with matrix grains.

Figure 2:
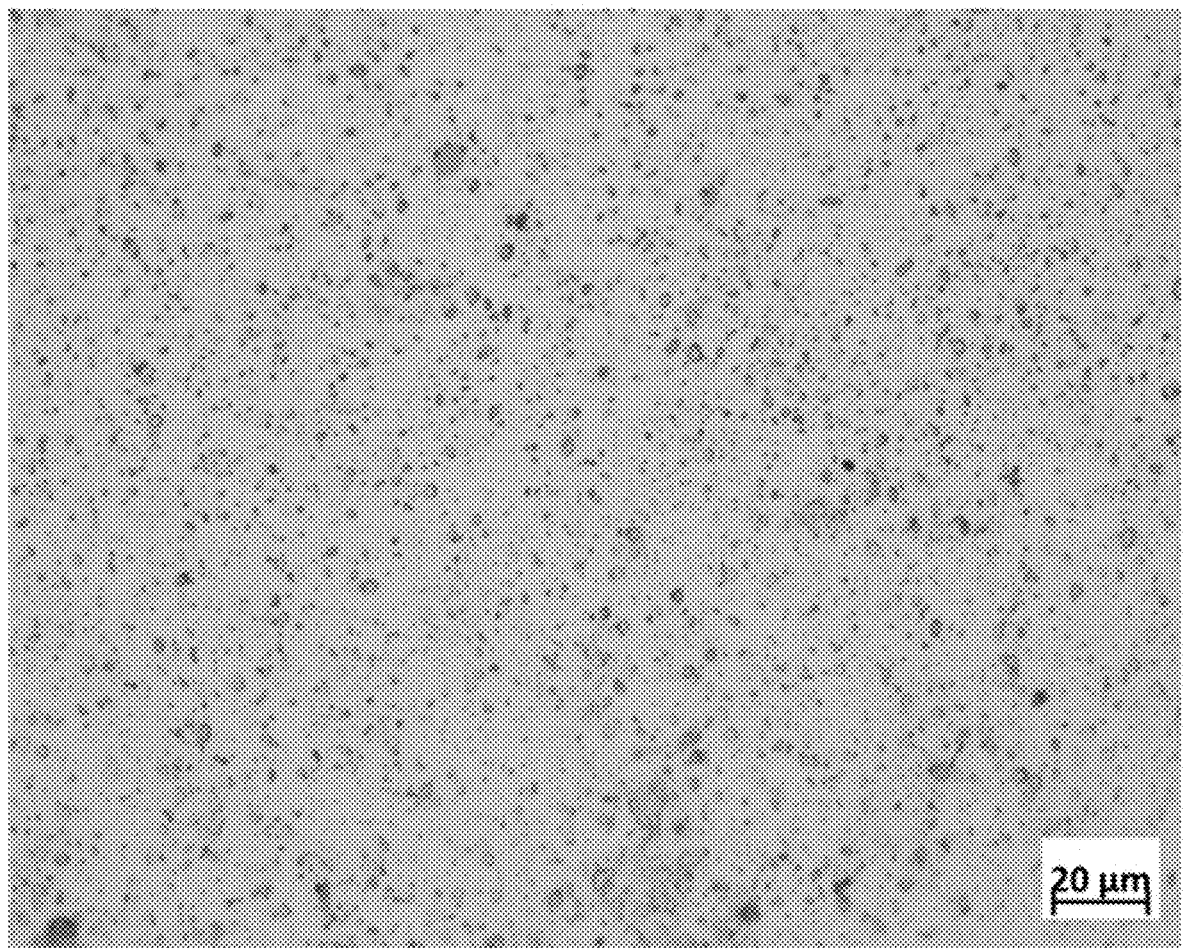
FIG. 2 shows a metallographic structure of an Al-2.3Ti—B alloy after severe plastic deformation in Example 1.

FIG. 2 showed a metallographic structure of Al-2.3Ti—B intermediate alloy after severe plastic deformation in Example 1. It can be seen that, the TiB2 particles after severe plastic deformation were all at nano scale with a narrow distribution range of particle size. The TiB2 particles were dispersed among matrix grains.

Figure 3:
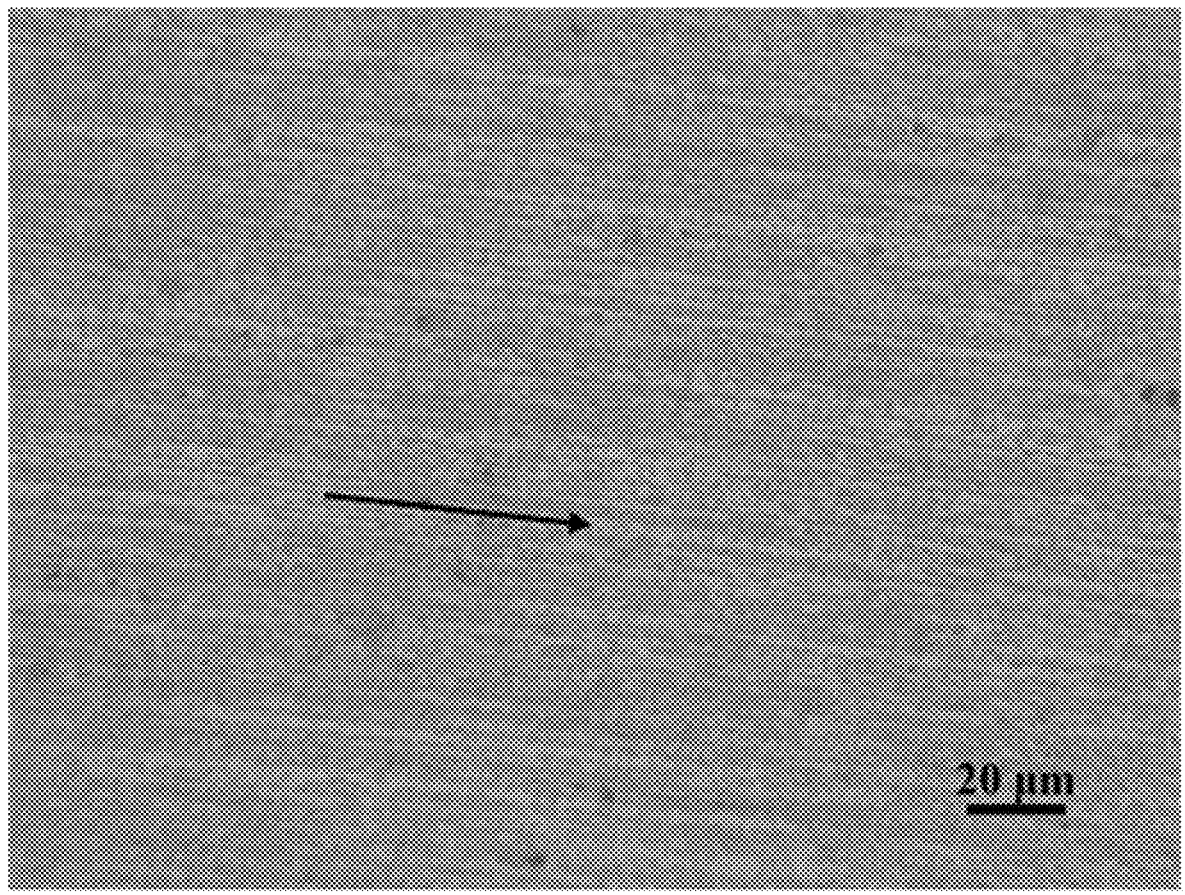
FIG. 3 shows a metallographic structure of an Al—Zn—Mg—Cu alloy wire reinforced by TiB2 particles obtained in Example 1.

FIG. 3 showed a metallographic structure of the Al—Zn—Mg—Cu alloy wire (with a composition of Al-6Zn-2.5Mg-1.5Cu-1.94Ti-0.85B-0.2Cr) reinforced by TiB2 particles obtained in Example 1. A direction indicated by an arrow in FIG. 3 referred to a processing direction. It can be seen from FIG. 3 that, during alloy smelting and processing, TiB2 particles was not changed in size, and a second phase and TiB2 nanoparticles had a fine size with even distribution and dispersion. There was no obvious coarse second phase or particle agglomeration.

Figure 4:
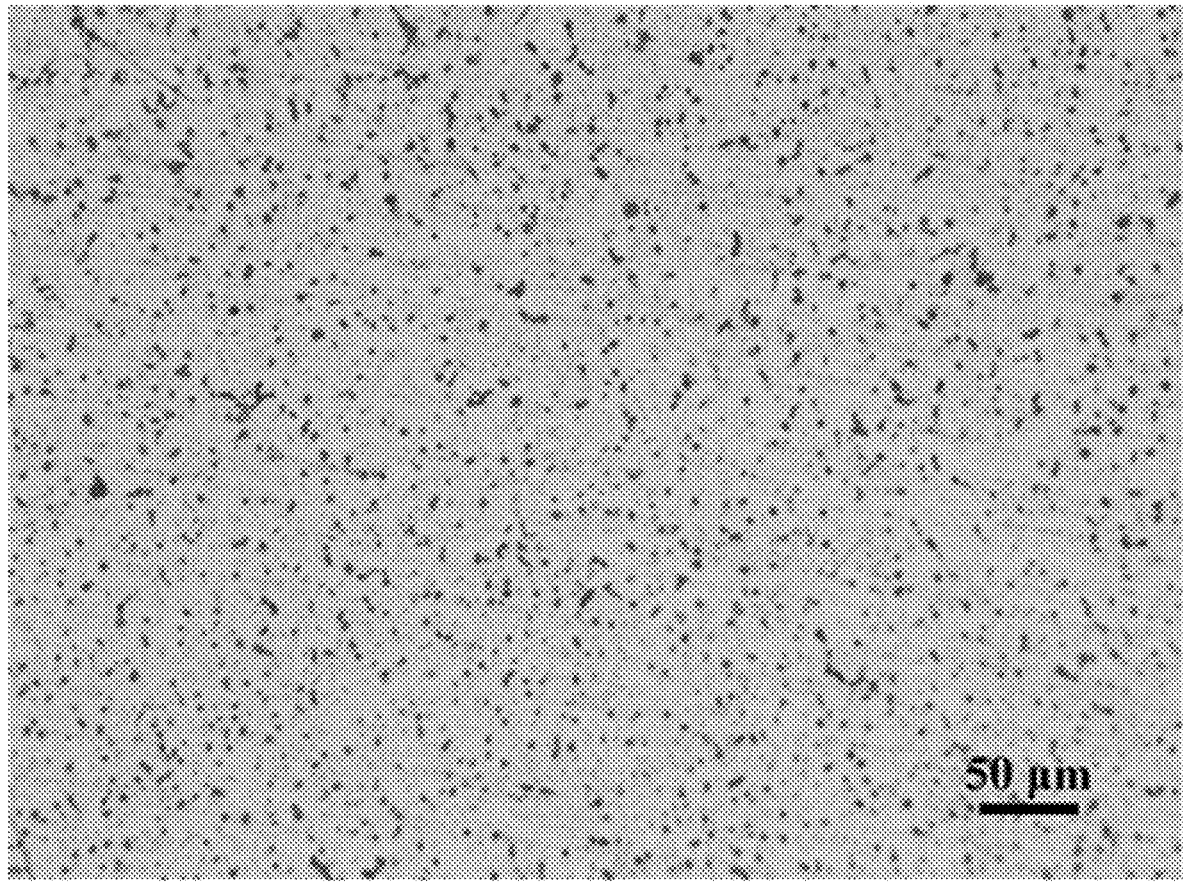
FIG. 4 shows a metallurgical structure of a welded seam of an Al—Zn—Mg—Cu alloy wire reinforced by TiB2 particles obtained in Example 1.

FIG. 4 showed a metallographic structure of the Al—Zn—Mg—Cu alloy wire reinforced by TiB2 particles after melting by welding obtained in Example 1. As can be seen from FIG. 4, no welding hot cracks were found in a weld seam structure. The grains were fine equiaxed grains. The second phase and TiB2 nanoparticles had a fine size with even distribution and dispersion. There was no obvious coarse second phase or particle agglomeration.

Figure 5:
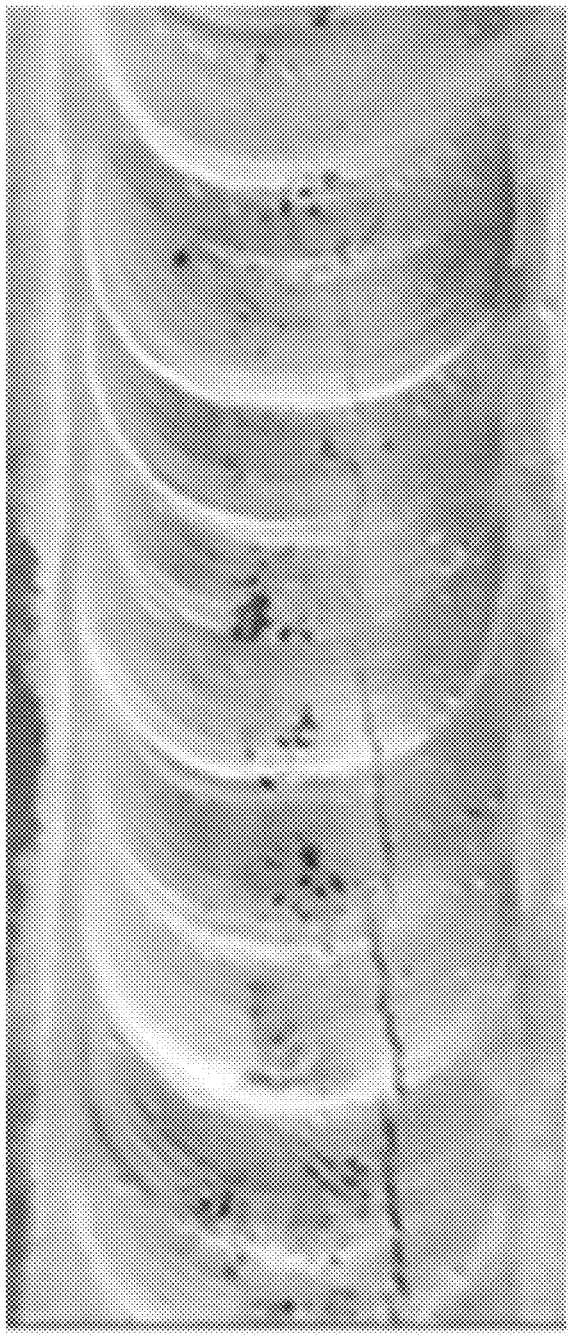
FIG. 5 shows a real welded seam of a conventional Al—Zn—Mg—Cu alloy wire without addition of a severe plastic deformed Al—Ti—B intermediate alloy in Comparative Example 1.
Figure 6:
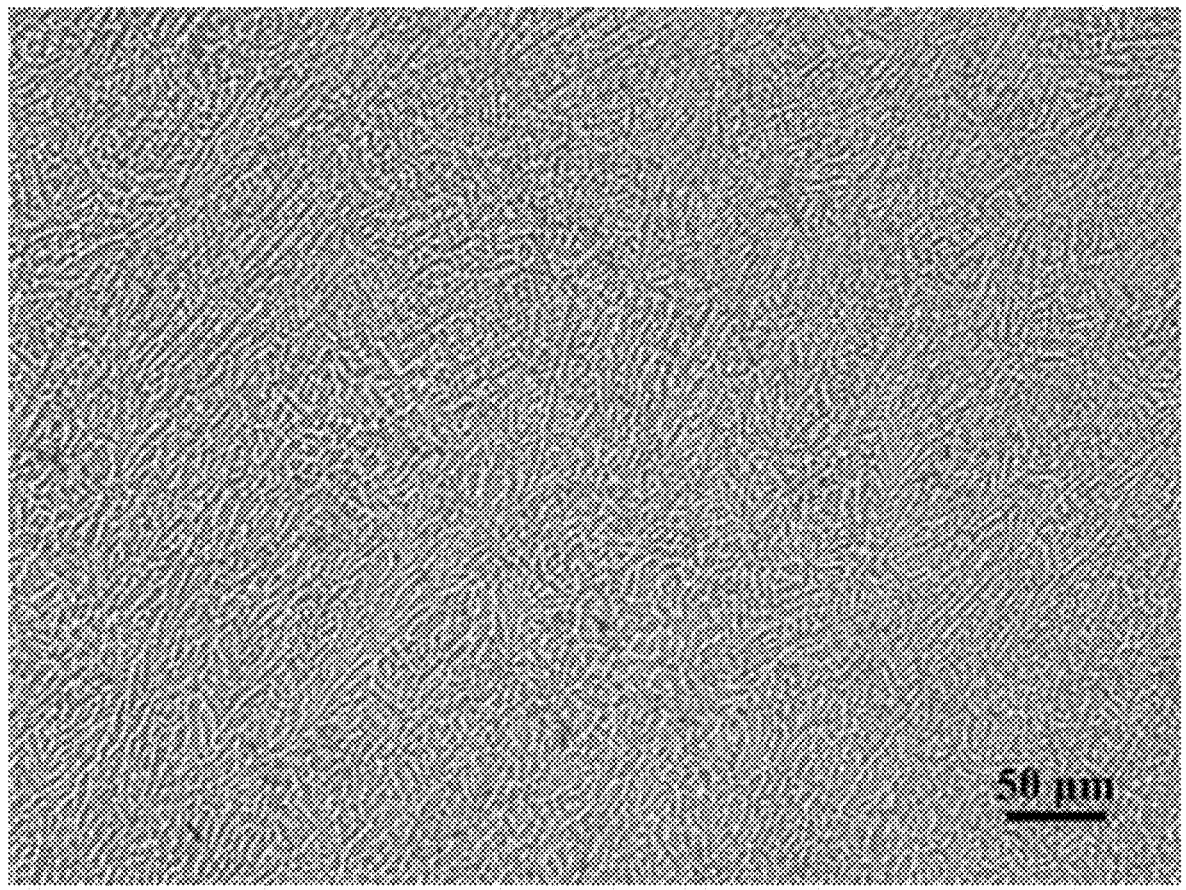
FIG. 6 shows a metallurgical structure of a welded seam of the conventional Al—Zn—Mg—Cu alloy wire without addition of a severe plastic deformed Al—Ti—B intermediate alloy in Comparative Example 1.

FIG. 5 showed a real welded seam of the conventional (without severe plastic deformed Al—Ti—B intermediate alloy) Al—Zn—Mg—Cu alloy wire after welding in Comparative Example 1. It can be seen from the figure that, there were obvious hot cracks due to solidification (as indicated by an arrow). FIG. 6 showed a metallographic structure of a welded seam of the conventional Al—Zn—Mg—Cu alloy wire (without severe plastic deformed Al—Ti—B intermediate alloy) after welding in Comparative Example 1. As can be seen from the figure, the grains in the weld seam structure were coarse dendritic grains.

2. XRD Characterization

Figure 7:
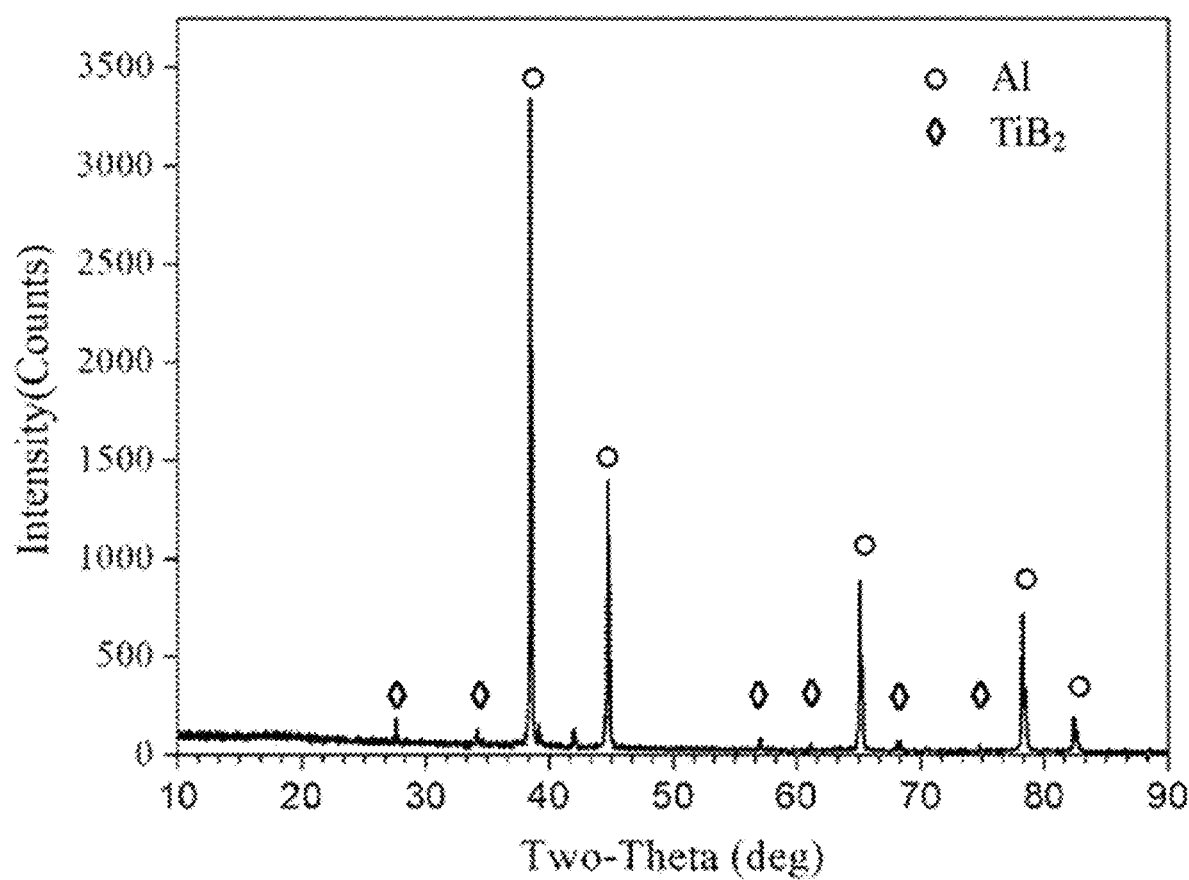
FIG. 7 shows an x-ray powder diffraction (XRD) pattern of an Al—Zn—Mg—Cu alloy reinforced by TiB2 particles obtained in Example 1.

An X-ray diffractometer was used to measure the alloys obtained in Examples 1-5 and Comparative Example 1. Taking the Al—Zn—Mg—Cu alloy wire reinforced by TiB2 particles obtained in Example 1 as an example, an XRD pattern was shown in FIG. 7. XRD test results proved presence of TiB2 nanoparticles in the Al—Zn—Mg—Cu alloy.

The above are only examples of the present invention, and common knowledge such as specific structures and characteristics known in the art is not described here too much. It should be noted that those skilled in the art may further make several variations and improvements without departing from the scope of the present invention, but such variations and improvements should also be deemed as falling within the protection scope of the present invention without affecting the implementation effect and practicability of the patent. The protection scope claimed in this application shall be based on contents of claims, and disclosure in the specification such as the detailed description may be used to interpret the contents of the claims.

What is claimed is:

1. A method of preparing a 7000-series aluminum alloy wire for additive manufacturing, comprising the following steps:
   step 1: subjecting an Al—Ti—B intermediate alloy containing TiB$_2$ particles generated in situ to plastic deformation to obtain an intermediate alloy containing TiB$_2$ nanoparticles having a particle size of 50-1,000 nm;
   step 2: adding other metal or intermediate alloy into the intermediate alloy containing TiB$_2$ nanoparticles obtained in step 1 to obtain a mixed material, smelting the mixed material at 750-780° C. to obtain a smelted material, and casting the smelted material into a cast round rod;
   step 3: subjecting the cast round rod obtained in step 2 to hot extrusion to obtain a wire blank with φ of 8-10 mm; and
   step 4: subjecting the wire blank obtained in step 3 to hot rolling, drawing, intermediate annealing and surface treatment to obtain the 7000-series aluminum alloy reinforced by particles, wire with φ of 1.0 mm-2.4 mm.

2. The method of preparing the 7000-series aluminum alloy wire for additive manufacturing according to claim 1, wherein the plastic deformation in step 1 is implemented by a high-speed friction stir process with a stirring needle at 800-2,000 r/min for 1-5 times.

3. The method of preparing the 7000-series aluminum alloy wire for additive manufacturing according to claim 2, wherein the cast round rod in step 3 is subjected to homogenizing heat treatment at 450-490° C. for 10-24 h before hot extrusion at 400-450° C. at 5-10 mm/min.

4. The method of preparing the 7000-series aluminum alloy wire for additive manufacturing according to claim 3, wherein the hot rolling in step 4 is carried out at 350-420° C. for 0.5-1 h, and the drawing is carried out at a normal temperature.

5. The method of preparing the 7000-series aluminum alloy wire for additive manufacturing according to claim 4, wherein the intermediate annealing in step 4 is carried out at 380-430° C. for 1-6 h, and the surface treatment comprises surface scraping, sizing, degreasing and cleaning.

6. The method of preparing the 7000-series aluminum alloy wire for additive manufacturing according to claim 1, wherein the plastic deformation in step 1 is implemented by an equal-channel angular pressing process with a channel angle of 90-120 degrees for 1-5 cycles.

7. The method of preparing the 7000-series aluminum alloy wire for additive manufacturing according to claim 6, wherein the cast round rod in step 3 is subjected to homogenizing heat treatment at 450-490° C. for 10-24 h before hot extrusion at 400-450° C. at 5-10 mm/min.

8. The method of preparing the 7000-series aluminum alloy wire for additive manufacturing according to claim 7, wherein the hot rolling in step 4 is carried out at 350-420° C. for 0.5-1 h, and the drawing is carried out at a normal temperature.

9. The method of preparing the 7000-series aluminum alloy wire for additive manufacturing according to claim 8, wherein the intermediate annealing in step 4 is carried out at 380-430° C. for 1-6 h, and the surface treatment comprises surface scraping, sizing, degreasing and cleaning.

10. The method of preparing the 7000-series aluminum alloy wire for additive manufacturing according to claim 1, wherein the plastic deformation in step 1 is implemented by a high-pressure torsion process with 1-20 turns.

11. The method of preparing the 7000-series aluminum alloy wire for additive manufacturing according to claim 10, wherein the cast round rod in step 3 is subjected to homogenizing heat treatment at 450-490° C. for 10-24 h before hot extrusion at 400-450° C. at 5-10 mm/min.

12. The method of preparing the 7000-series aluminum alloy wire for additive manufacturing according to claim 11, wherein the hot rolling in step 4 is carried out at 350-420° C. for 0.5-1 h, and the drawing is carried out at a normal temperature.

13. The method of preparing the 7000-series aluminum alloy wire for additive manufacturing according to claim 12, wherein the intermediate annealing in step 4 is carried out at 380-430° C. for 1-6 h, and the surface treatment comprises surface scraping, sizing, degreasing and cleaning.

14. The method of preparing the 7000-series aluminum alloy wire for additive manufacturing according to claim 1, wherein the cast round rod in step 3 is subjected to homogenizing heat treatment at 450-490° C. for 10-24 h before hot extrusion at 400-450° C. at 5-10 mm/min.

15. The method of preparing the 7000-series aluminum alloy wire for additive manufacturing according to claim 14, wherein the hot rolling in step 4 is carried out at 350-420° C. for 0.5-1 h, and the drawing is carried out at a normal temperature.

16. The method of preparing the 7000-series aluminum alloy wire for additive manufacturing according to claim 15, wherein the intermediate annealing in step 4 is carried out at 380-430° C. for 1-6 h, and the surface treatment comprises surface scraping, sizing, degreasing and cleaning.

\* \* \* \* \*